July 21, 1970  A. R. BRINGEWALD  3,521,472
PROCESS AND APPARATUS FOR THE PRODUCTION OF PARTS FROM
DUCTILE MATERIALS WITH INTEGRAL STIFFENERS
ON ONE OR BOTH SIDES
Filed Feb. 3, 1967  3 Sheets-Sheet 1
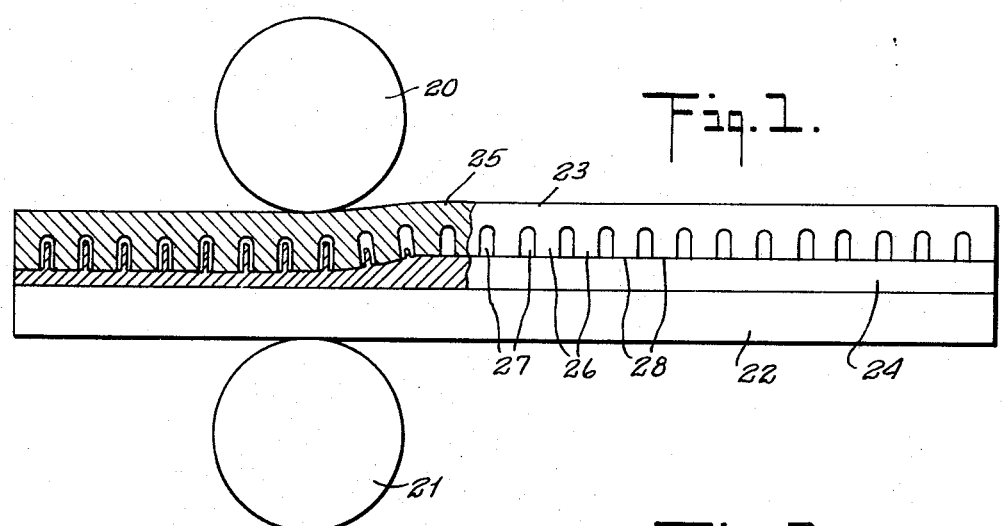
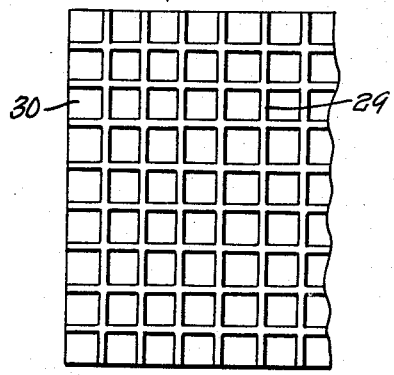
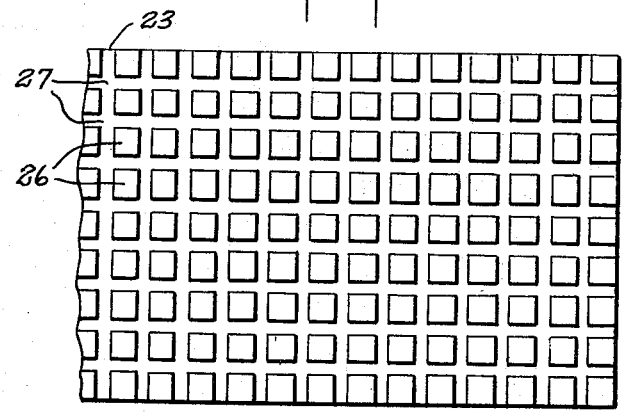
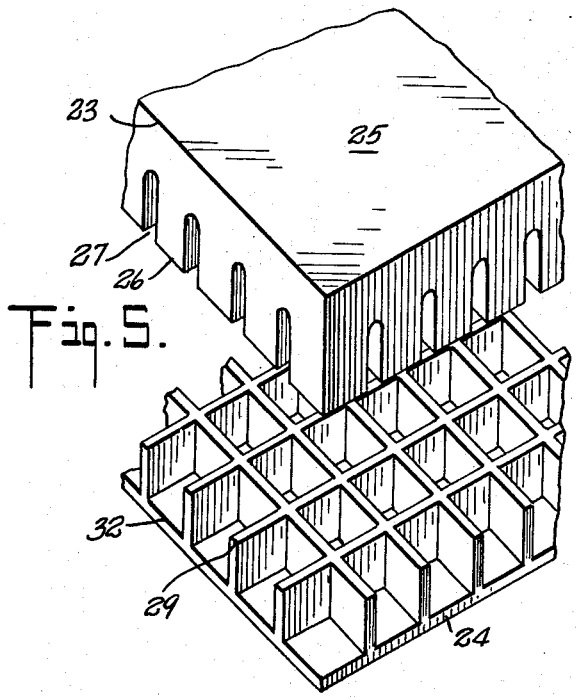
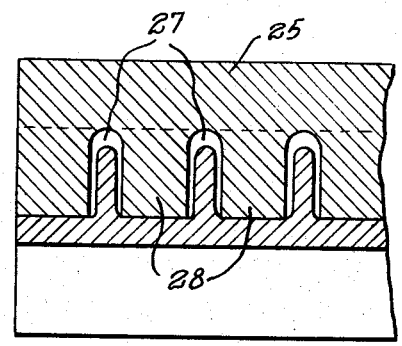
INVENTOR.
AUGUST R. BRINGEWALD
BY
ATTORNEY

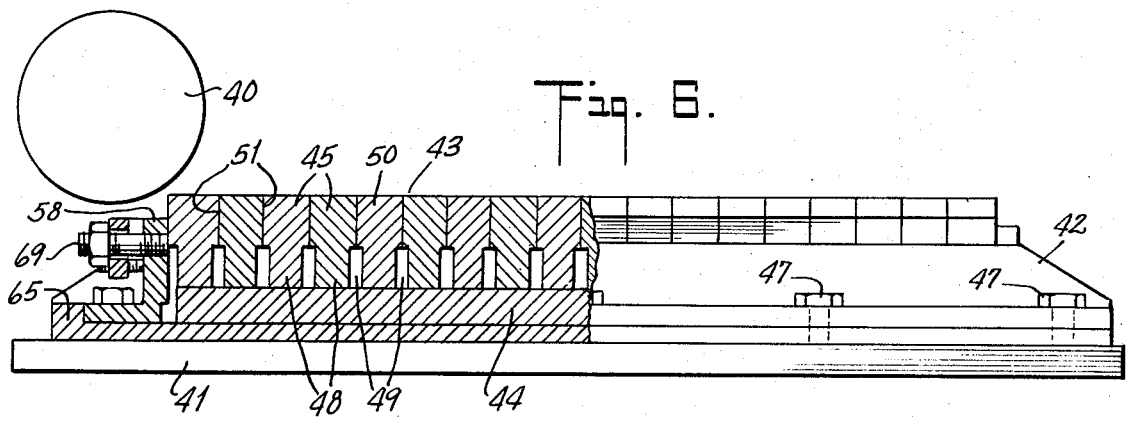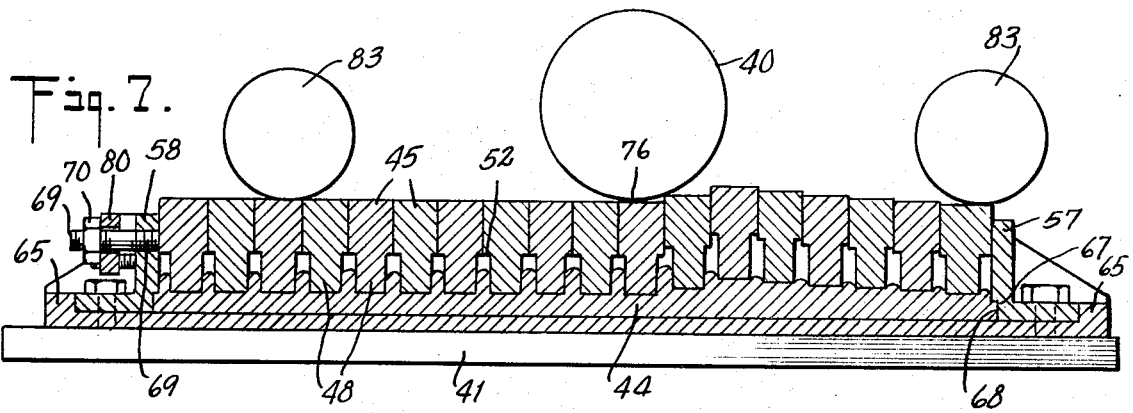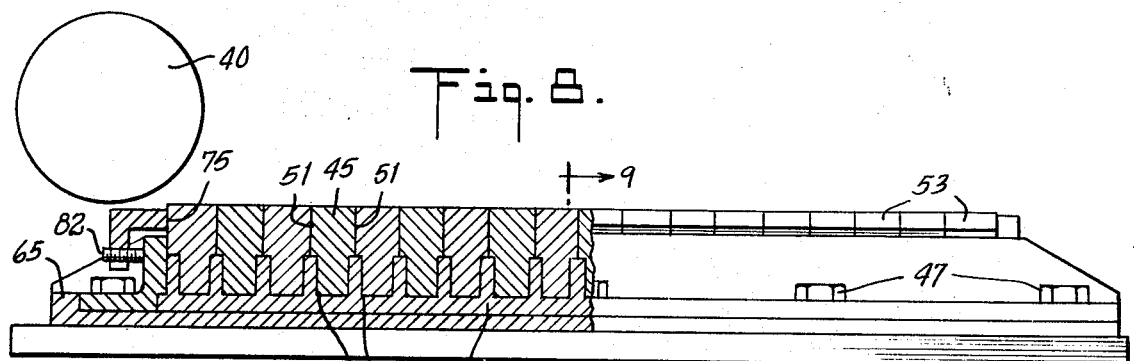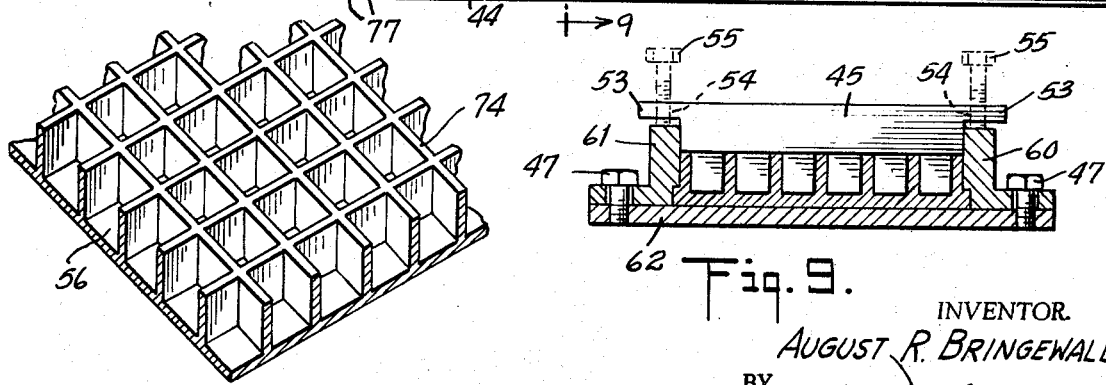

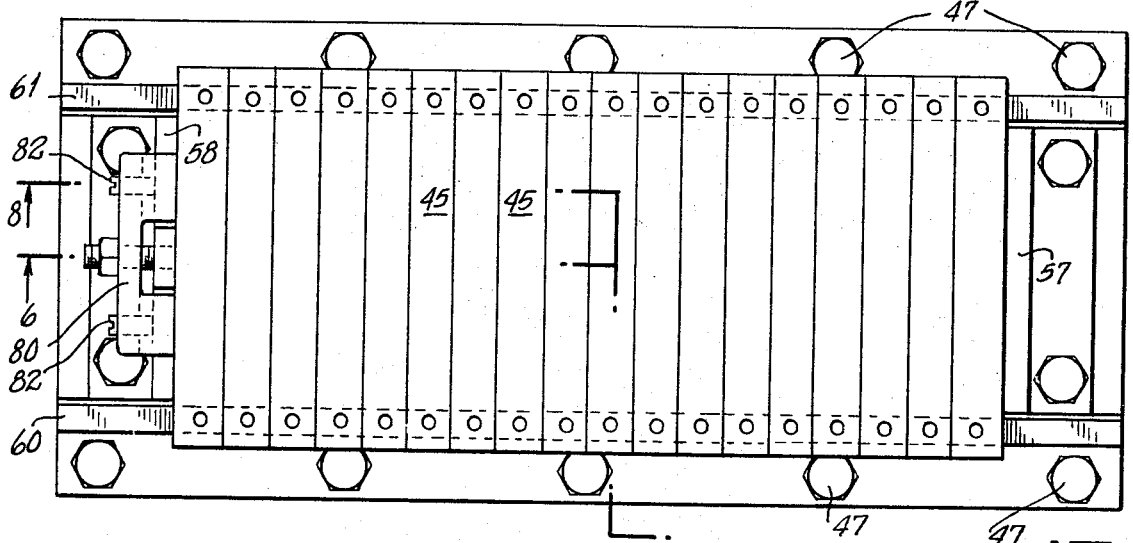
Fig. 10.
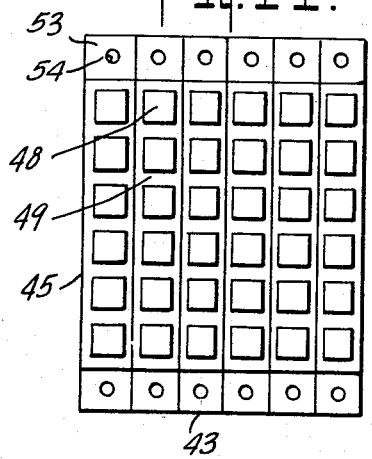
Fig. 11.
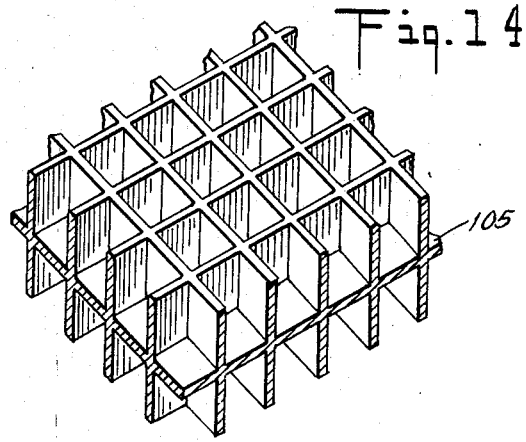
Fig. 14.
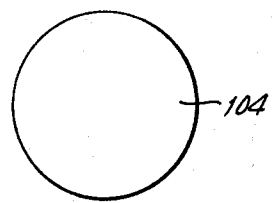
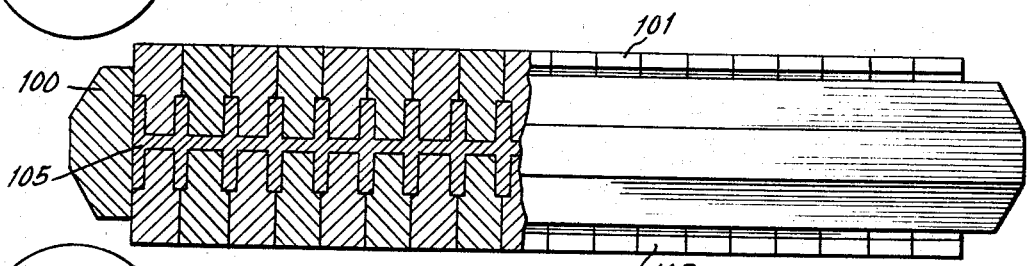
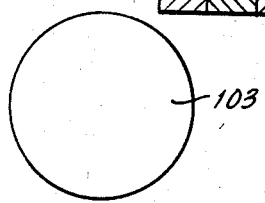
Fig. 13.
INVENTOR.
AUGUST R. BRINGEWALD
BY
ATTORNEY

United States Patent Office 3,521,472
Patented July 21, 1970

3,521,472
PROCESS AND APPARATUS FOR THE PRODUCTION OF PARTS FROM DUCTILE MATERIALS WITH INTEGRAL STIFFENERS ON ONE OR BOTH SIDES
August R. Bringewald, Huntington, N.Y., assignor to Bringewald Process Corporation, Suffolk County, N.Y.
Continuation-in-part of applications Ser. No. 383,011, July 16, 1964, and Ser. No. 438,204, Mar. 9, 1965. This application Feb. 3, 1967, Ser. No. 613,896
Int. Cl. B21c 23/21
U.S. Cl. 72—184
14 Claims

ABSTRACT OF THE DISCLOSURE

Method and apparatus for making parts of regular or irregular shape from blanks of ductile material. Blank is placed within a frame defining the peripheral dimensions of the finished part. Frame and blank are placed between opposed dies, at least one of which is movable into and conforms peripherally with the frame. When dies are spaced apart by predetermined distance, they cooperate with frame to define shape of finished part. Said one die is also articulated, so that parts of it are movable relative to other parts. Parts of articulated die are successively forced toward opposing die, so that parts of blank are successively forced to flow into recesses of dies and frame. After all parts of articulated die have been moved toward the opposing die through desired distance, blank material has been forced to flow so as to take up form of finished part.

Articulation of die is preferably transverse to its path of movement through forcing apparatus, which may be conventional rolling mill.

CROSS REFERENCES

This application is a continuation-in-part of my application Ser. No. 383,011, filed July 16, 1964, for Multiple Extrusion Process, and my application Ser. No. 438,204, filed Mar. 9, 1965, for Multiple Extrusion Process, both now abandoned.

BACKGROUND OF THE INVENTION

Prior to my invention large skins for airplane wings having integral stiffeners arranged chord-wise and/or span-wise or skins for missile bodies having integral stiffeners arranged in cellular patterns, to name only a few examples, have been machined out of solid bar stock of huge dimensions on chip removing machines in very time-consuming processes, because there has been no other process available to produce these structural members in a more economical way. Machining these parts out of solid material is not only a very time-consuming but also material-wasting process. Chip material of 75% to 85% of the original blank material is more often the rule rather than the exception.

SUMMARY OF THE INVENTION

According to the present invention, the foregoing disadvantages and wasteful procedures are avoided.

One object of the invention is to provide a multiple extrusion process employing an articulated die structure which may consist of a flexible steel extrusion die having a large number of extrusion punches separated by cavities, the punches having been arranged and adapted to extrude the stiffening elements in the desired cellular pattern out of a solid blank material, such as for example a blank of aluminum to provide an integrally stiffened structure of homogeneous material.

The articulated die may in the alternative take the form of a large number of segments, having a multiple number of extrusion punches separated by extrusion cavities. The die together with a blank of material, such as for example aluminum, is placed in a container for the purpose of restraining the material and, by preferably rolling mill techniques, the material is forced into plastic flow upwardly or downwardly or in both directions in respect to the plane of the blank being processed.

Whether the articulated die is formed of flexible material such as for example spring steel, or whether it is built up of a plurality of segments, an ordinary high pressure rolling mill is employed, and the aluminum or other blank material on which the integral stiffening projections are being formed is passed through the rolling mill simultaneously with the die. The arrangement is such that the metal blank of aluminum or other suitable material on which the extrusions are to be formed is not elongated by the rolling mill, but the metal is formed with the projections of the desired pattern either on the top or on the bottom or on both surfaces of the blank.

Although the primary object of the present invention is to make light-weight panels having integral stiffeners arranged in the desired cellular pattern, additional objectives are to manufacture numerous other components ranging from small integrally stiffened parts to large integrally stiffened structural components for airplane frames, guided missile bodies, space vehicle frames, automobile bodies, ship hulls, and architectural structures having the integral stiffeners arranged in any desired pattern. The restrictions of size of the parts to be made are dependent only on the availability of the size and properties of the die material, the size of the blank material, and the size and power of the rolling mill equipment.

BRIEF DESCRIPTION OF THE DRAWINGS

FIG. 1 is a side elevation of the arrangement of the principal components embodying the present invention, including a portion of a flexible die having the form of the metallic strip formed of spring steel or the like.

FIG. 2 is a portion of the lower face of the flexible die of FIG. 1 showing a typical pattern of multiple extrusion punches.

FIG. 3 is a plan view of a portion of a completed panel, the cellular pattern of the stiffening elements corresponding to the extrusion punch pattern of the flexible die of FIG. 2.

FIG. 4 is a fragmentary view of the die and the extrusion punch of the left end of FIG. 1 on an enlarged scale.

FIG. 5 is a perspective detail of a corner of the flexible die and the finished integrally stiffened panel.

FIG. 6 is a side elevational view partially sectionalized on the line 6—6 of FIG. 10, illustrating a modified form of die, and showing the arrangement of the main components in initial position ready for processing.

FIG. 7 is a side sectional view showing the arrangement of the main components of the apparatus of FIG. 6 in an intermediate position during the process, the blank partially processed.

FIG. 8 is a side elevational view partially sectionalized on the line 8—8 of FIG. 10 showing the arrangement of the main components after processing.

FIG. 9 is a vertical section on the line 9—9 of FIG. 8.

FIG. 10 is a plan view of FIGS. 6, 7 and 8.

FIG. 11 is a view showing a portion of the lower face of the die of FIG. 10 and indicating a typical pattern of multiple extrusion punches.

FIG. 12 is a fragmentary perspective view of a finished panel having integral stiffening elements only on one side.

FIG. 13 is a side elevation, partially sectionalized, to show the relation of the main components after processing a panel having integral stiffening elements on both faces.

FIG. 14 is a fragmentary perspective view of a finished panel having integral stiffening elements on both faces.

DETAILED DESCRIPTION

The process of this invention may be carried out either in the structure illustrated in FIGS. 1 to 5, inclusive, or in the structure illustrated in detail in FIGS. 6 to 14.

Reference will first be made to the structural embodiment of FIGS. 1 to 5, inclusive, which indicates heavy rolling mill equipment by upper roll 20 and lower roll 21, moving bed 22, flexible die 23, and a blank material which may by way of example be a blank of aluminum designated 24.

The flexible die 23, preferably made from tool steel, heat-treated to the required properties, consists of pressure pad 25 and extrusion punches 26, which are separated by extrusion cavities 27. The extrusion cavities 27 are machined into the lower face 28 of the flexible die 23, simultaneously producing the extrusion punches 26 arranged in the desired cellular pattern. A typical cellular punch-cavity pattern of the extrusion punches 26 and cavities 27 of the flexible die is well shown in FIG. 2, and the corresponding pattern of the stiffening elements 29 of the panel 30 is well shown in FIG. 3. This pattern is given for purposes of illustration and it should not be considered as limiting the process to this specific design. Panels and similar construction parts, or any other parts of any ductile material having integral stiffeners arranged in any pattern may be produced by this new process.

Referring more specifically to FIGS. 6 to 14, inclusive, the process of the invention may be carried out by the use of the segmented die structure herein illustrated and which will now be described more in detail.

The rolling mill equipment is here illustrated by roll 40, the moving bed 41, container 42, segmented die 43 and the blank of material 44 under treatment.

The segmented die 43 designed to produce a desired structure is located together with the blank of material 44 in the container 42. This die is composed of segments 45 having a plurality of extrusion punches 48, separated from each other by extrusion cavities 49. The segments 45 are arranged parallel to the axis of rotation of the roll 40 and clamped firmly together between the end wall 57 and clamp 80 which is supported by end wall 58. The segments 45 have side guides 51 on both sides of their heads 50 to provide support and guidance for each other for the purposes hereinafter set forth.

The transition of the extrusion punches 48 into the heads 50 provides the extrusion cavities 49 and the shoulders 52, the latter being adapted to restrain the plastic flow of the material upwardly during the extrusion process. The ends 53 of the segments 45 have threaded holes 54 to receive temporarily the threaded bolts 55 for stripping the segments 45 from the finished part, as illustrated in FIG. 9.

The container 42 comprises end wall 57, end wall 58, side wall 60, side wall 61 and base plate 62, all of which said walls are fastened by bolts 47. Recesses 67 are provided in the lower internal edges of all of said walls to receive projections 68 extruded out of the blank of material 44 during the progression of the extrusion process for the purpose of holding the finished panel 56 firmly in the container 42 while stripping the segments 45 of the die 43 from said finished panel 56 (see FIGS. 8 and 9). Each end of base plate 62 has a dam 65 integral with said base plate to support the end walls 57 and 58 in resisting the very high longitudinal compression forces generated in the blank of material 44 during the extrusion process.

The end wall 58 of the container 42 has a threaded bolt 69 to hold and support the clamp 80 in clamping position to receive nut 70 cooperating with the threaded bolt 69. By turning the nut 70 against the clamp 80, all of the segments 45 are tightly clamped between the end wall 57 and the clamp 80 which is supported by end wall 58, thereby eliminating any undesired play between said segments. Two leveling screws 82 are provided in the clamp 80 for the purpose of leveling the clamping faces 75 of clamp 80 in respect to the corresponding side guides 51 of the segments 45.

To produce an integrally stiffened construction part by this invention a blank of material 44 prepared for this specific part is loaded onto the container 42 and the segments 45 of the die 43, with faces 46 of extrusion punches 48 directed toward said blank of materail on top of the same. In this position all the segments 45 of the die 43 are tightly clamped together between the end wall 57 and the clamp 80 of the container 42 by turning the nut 70 firmly against said clamp. This arrangement of the loaded container 42, best shown in FIG. 6, has a certain initial thickness which determines the adjustment of the roll 40 to the gap between said roll and the moving bed 41, best suited for a desired extrusion result.

The container and the clamping system heretofore described are intended to be illustrative of operative means for accomplishing the functions set forth, and it should be understood that variations may be made within the spirit of the invention, and only such limitations should be imposed as are indicated in the appended claims.

The moving bed 41 loaded with container 42 and its contents is moved in reciprocating passes under the roll 40. A contact area 76 of the roll 40 engages the segments 45 successively, thereby distributing the entire pressure of said roll over a small area of the blank, which in the example illustrated, extends under one or two of the segments 45. The small area being compressed is moved progressively over the whole area of the blank, as the bed 41 moves under the roll. The moving bed 41, container 42 and its contents pass between roll 40 and a suitable underlying support, which may be an opposing roll such as the roll 21 appearing in FIG. 1 opposite roll 20. The segments of the die 43 are tightly clamped between the end wall 57 and the clamp 80 of the container 42, and during each reciprocating pass the segments 45 due to the pressure of the roll 40 slide on each other at their side guides 51 to adjust themselves to the pressure of roll 40. These adjustments continue step by step for the succeeding extrusion passes through to the final step and completion of the part.

The tremendous pressure of the roll 40 developed during the extrusion process is transmitted progressively into the blank of material 44 by the extrusion punches 48, forcing the material into plastic flow in rolling direction; but since the material is trapped between the end walls 57 and 58 of the container 42, very high compression forces are generated in the material longitudinally, causing the material to upset between roll 40 and the trailing end wall, whereby the upsetting effect supports the desired flow of the material upwardly in respect to the plane of the blank of material 44, as will be seen. The lateral plastic flow of the material and therefore its compression forces are small in comparison with the same in rolling direction and are restrained between the side walls 60 and 61 of the container 42.

The shoulders 52 of the segments 45 of the die 43 restrain the plastic flow of the material upwardly during the extrusion process. By subsequent reciprocating extrusion passes, the excess of upset material is squeezed down by the shoulders 52 of the segments 45 and distributed until all cavities 49 of the die 43 are filled uniformly. The volume of the material is to be held within a close tolerance to fill all cavities of the die 43 and to avoid flashing of the material between the segments 45 which could be caused by an excessive amount of material.

The magnitude of the impact of the roll 40 on the extrusion punches 48 depends on the ductility of the material being processed. The impact causes the material to be processed to act as viscous fluid with respect to the orifice effect, and to extrude up and around the extrusion punches 48 into the extrusion cavities 49 to form the stiffening elements 74. By the orifice effect, the thickness of the stiffening elements 74 is always less than the width of the extrusion cavities 49, but varies in accordance with the sharpness of the corners 77 of the extrusion punches 48 over which the extrusion process takes place. The loss in thickness of the stiffening elements 74 supports stripping the segments 45 of the die 43 from the finished part. The stripping of the die segments may also be aided by providing suitable draft angles around the punches and the corners and edges of the punches may be rounded to aid the flow of the material during processing as it is common practice in the forging industry.

After finishing the part, the segments 45 of the die 43 may be stripped from said part by inserting threaded bolts 55 into the corresponding threaded holes 54 provided at each end 53 of said segments, and turning said bolts against the side walls 60 and 61 of the container 42. The finished part may be removed from the container by disassembling the same.

Based on the foregoing, a typical cellular pattern of the extrusion punches 48 and extrusion cavities 49 of the die 43 is shown in FIG. 11, and the corresponding pattern of the stiffening elements 74 of panel 56 is presented in FIG. 12. The pattern shown is given for illustration purposes only and is not limiting the process to this design. Panels and similar construction parts having integral stiffeners arranged in any pattern may be produced by applicant's process.

The principles of manufacturing integrally stiffened parts having stiffening elements on one face only, may also be applied to produce panels of structural members having integral stiffeners on both faces of the part. To this end the blank of material is restrained in a frame 100 and sandwiched between an upper die 101 and a lower die 102 to be processed for multiple extrusion in a rolling mill having a lower roll 103 and an adjustable upper roll 104, as shown in FIG. 13. A panel 105 having stiffening elements extruded out of a blank of material on both faces is shown in FIG. 14.

The horizontal compression forces generated in the blank 44 by the vertical compression forces of roll 40 may cause the material, trapped in the container 42, to buckle or upset in rolling direction resulting in non-uniform material distribution. To counteract this undesired tendency, hold-down elements or rolls 83, as illustrated in FIG. 7, are provided to apply controlled auxiliary pressure upon the die segments on both sides of roll 40. The auxiliary pressure of rolls 83 act like dams to confine the pressure of roll 40 to the area between roll 40 and the trailing roll 83 and force the material in this area to follow the path of least resistance and to fill all cavities 49 of the punches 48 progressively as the die 43 advances under roll 40.

Heat generated in the blank of material 44 by the impact of the roll 40 exercises a profound effect and operates to reduce the extrusion pressure by increasing the ductility of the materials. Ductile material, like pure aluminum, may be processed at room temperature. Less ductile material, like aluminum alloys, steel and titanium, may be heated to increase the ductility. The heat may be applied directly to the blank of material 44 in a furnace, by electrical resistance, electrical induction, or a heated platen sandwiched between the base plate 62 of the container 42 and the blank of material 44.

I claim:

1. The method of making a part of complex form, comprising the steps of:
   (a) preparing a blank of ductile material, having a volume substantially equal to the volume of the part to be made, with overall dimensions in two of three mutually perpendicular directions which are no greater than the overall dimensions of the part to be made in the corresponding directions and having its dimensions in the third direction greater than that of the part to be made in at least one locality and less than that of the part to be made in at least one other locality;
   (b) confining said blank in a substantially closed chamber having fixed dimensions in said two directions equal to the corresponding dimensions of the part to be made, said chamber also having opposed surfaces defining the dimensions of said substantially closed chamber in said third direction and conforming to the surfaces of the part to be made, said opposed surfaces being initially spaced farther apart than the dimensions of the part to be made in said third direction;
   (c) forcing said opposed surfaces toward one another until they are spaced apart by the dimensions of the part in said third direction, thereby compressing the material of the blank and forcing it to flow throughout the chamber and take up the form of the part;
   wherein the improvement comprises the steps of:
   (d) carrying out said forcing step by successively moving a multiplicity of relatively movabe portions of at least one of said opposed surfaces toward the other surface, each said portion being a small fraction of said one surface and extending from one side to the other of said one surface, said portions together comprising all of said one surface, and
   (e) continuing said successive movement of said portions until all portions of the two surfaces are spaced apart by the dimensions of the part in said third direction.

2. The method defined in claim 1, in which:
   (a) all the portions are moved sequentially toward the other surface through one of a series of incremental steps; and thereafter,
   (b) all the portions are moved sequentially through the next incremental step in said series.

3. The method defined in claim 1, including the step of holding portions of said one surface which are not being forced toward the other surface against movement away from said other surface.

4. Apparatus for making a part of complex form from a blank of simple form, comprising:
   (a) frame means for encircling the blank, said frame means having internal dimensions in two mutually perpendicular directions conforming to the corresponding dimensions of the part to be made and an internal surface extending perpendicular to both said directions;
   (b) two opposed die means for engaging the two surfaces of the blank not encircled by said frame means; at least one of said die means having at least one blind recess facing the blank to receive material extruded from the blank;
   (c) said frame means and said two opposed die means cooperating to form a substantially closed chamber;
   wherein the improvement comprises:
   (d) at least one of said die means being multiply articulated and thereby having multiple relatively movable portions, and also having a peripheral surface conforming to said internal surface of the frame means; and
   (e) means for successively and incrementally forcing the multiple portions of said one die means having the conforming peripheral surface into said frame means, thereby reducing the size of said chamber, compressing the blank and causing the material thereof to take up the form of the part.

5. Apparatus as defined in claim 4, in which said frame means has a peripheral recess in said internal surface spaced from the upper end thereof, said recess being effective when the blank is compressed to form a flange on the periphery of the finished part.

6. Apparatus for making a part of complex form from a blank of simple form, comprising:
  (a) frame means for encircling the blank, said frame means having internal dimensions in two mutually perpendicular directions conforming to the corresponding dimensions of the part to be made and an internal surface extending perpendicular to both said directions;
  (b) two opposed die means for engaging the two surfaces of the blank not encircled by said frame means; at least one of said die means having at least one blind recess facing the blank to receive material extruded from the blank;
  (c) said frame means and said two opposed die means cooperating to form a substantially closed chamber; wherein the improvement comprises:
  (d) at least one of said die means being articulated and having a peripheral surface conforming to said internal surface of the frame means; and
  (e) means for incrementally forcing the multiple portions of said one die means having the conforming peripheral surface into said frame means, thereby reducing the size of said chamber, compressing the blank and causing the material thereof to take up the form of the part, said forcing means comprising a pair of opposed pressure rolls adapted to receive between them the assembled frame means, die means and blank, and effective to press said die means toward one another.

7. Apparatus as defined in claim 6, in which said one die means having the conforming surface comprises a plurality of parallel die segments, each having opposed plane surfaces on parallel sides thereof, said plane surfaces being parallel to the axes of the pressure rolls and each plane surface abutting a plane surface on an adjacent die segment, said plane surfaces being effective as the die segments pass the rolls to slide over one another, so that portions of the blank are successively compressed by the rolls.

8. Apparatus as defined in claim 7, including means clamping said segments tightly together with said plane surfaces abutting.

9. Apparatus as defined in claim 7, in which:
  (a) each segment has a pair of projecting end portions extending over said frame means; and
  (b) stripping means cooperating with each said projecting end portion and with the frame means to force the associated segment away from the frame means and the finished part.

10. Apparatus as defined in claim 6, including auxiliary roll means located parallel to and spaced from said pressure rolls and effective to engage a portion of the die means with a lighter pressure than the portion between the pressure rolls to inhibit movement of the die means portion engaged by the auxiliary roll means away from the frame means.

11. Apparatus as defined in claim 4, in which:
  (a) each of said die means is articulated, each has at least one recess on the surface facing the blank, and each has a peripheral surface conforming to said internal surface of the frame means; and
  (b) said incremental forcing means is effective to force opposed portions of both said die means into said frame means simultaneously.

12. The method defined in claim 1, in which said forcing step is carried out by successively moving portions of at least one of said opposed surfaces, beginning with the portions at one end of said one surface and then moving the portion adjacent to the portion previously moved, until all portions of the two surfaces are spaced apart by the dimensions of the part in said third direction.

13. The method defined in claim 12, in which:
  (a) each said successive moving step advances one portion of said one surface only a fraction of the total distance between its initial position and its final position; and
  (b) repeating said successive moving steps to advance all portions of said surfaces to their final positions.

14. The method of making a part of complex form, comprising the steps of:
  (a) preparing a blank of ductile material having a volume substantially equal to the volume of the part to be made, with overall dimensions in two of three mutually perpendicular directions which are no greater than the overall dimensions of the part to be made in the corresponding directions and having its dimensions in the third direction greater than that of the part to be made in at least one locality and less than that of the part to be made in at least one other locality;
  (b) confining said blank in a closed chamber having fixed dimensions in said two directions no greater than the corresponding dimensions of the part to be made, said chamber also having opposed surfaces defining the dimensions in said third direction and conforming to the surfaces of the part to be made, said opposed surfaces being initially spaced farther apart than the dimensions of the part to be made in said third direction;
  (c) forcing said opposed surfaces toward one another until they are spaced apart by the dimensions of the part in said third direction, thereby compressing the material of the blank and forcing it to flow throughout the chamber and take up the form of the part;
wherein the improvement comprises the steps of:
  (d) carrying out said forcing step by successively moving portions of at least one surface toward the other surface until all portions of the two surfaces are spaced apart by the dimensions of the part in said third direction, the successive forcing of said portions of said one surface being accomplished by passing the closed chamber through a rolling mill.

References Cited

UNITED STATES PATENTS

| | | | |
|---|---|---|---|
| 543,607 | 7/1895 | Bates | 72—184 |
| 866,021 | 9/1907 | Hansen | 72—354 |
| 1,967,788 | 7/1934 | Seiferth | 72—207 |
| 2,988,838 | 6/1961 | Morgan | 72—184 |
| 3,197,857 | 8/1965 | Nippert | 72—354 |

LOWELL A. LARSON, Primary Examiner

U.S. Cl. X.R.

72—353, 377